Feb. 10, 1959 P. C. LAWSON 2,872,755
APPARATUS FOR BENDING GLASS
Filed Jan. 25, 1954
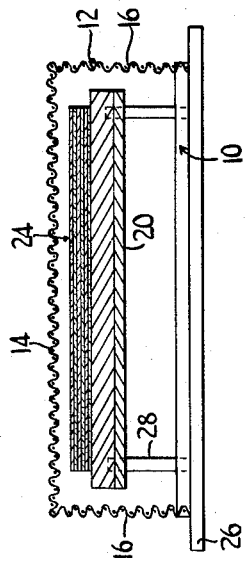
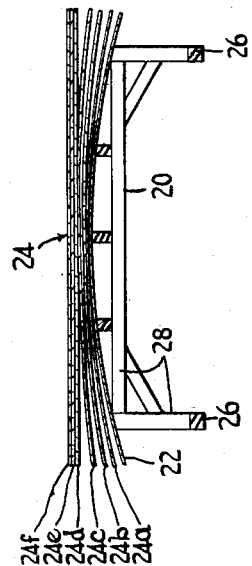
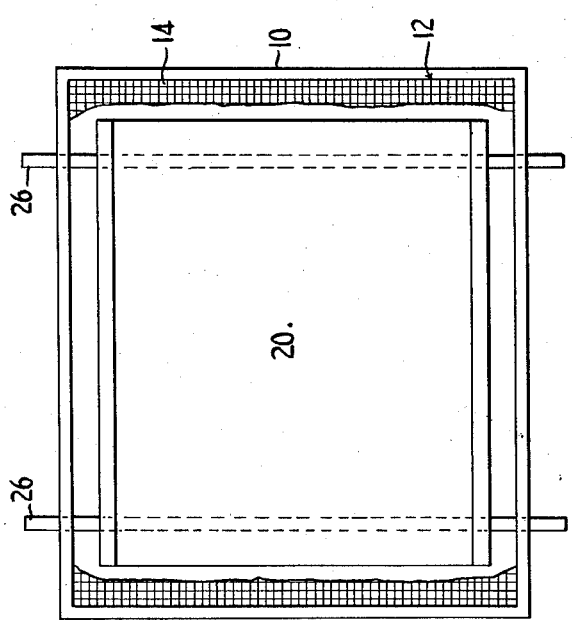
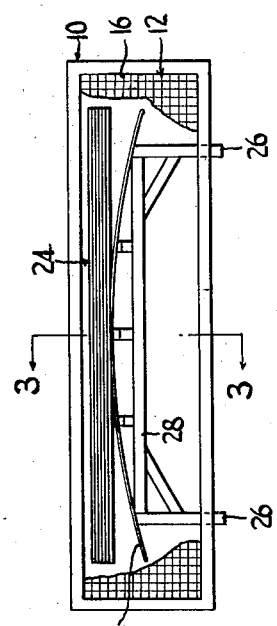
INVENTOR.
PAUL C. LAWSON
BY
ATTORNEY

United States Patent Office 2,872,755
Patented Feb. 10, 1959

2,872,755

APPARATUS FOR BENDING GLASS

Paul C. Lawson, New Kensington, Pa., assignor to Pittsburgh Plate Glass Company, Allegheny County, Pa., a corporation of Pennsylvania Application January 25, 1954, Serial No. 405,734

1 Claim. (Cl. 49—67)

The present invention relates to an improved apparatus for use in bending specialty glass.

It is the practice in bending glass prior to manufacturing bent laminated windshields or other specialty products comprising two or more sheets of bent glass, to stack the required number of sheets of flat glass upon a bending mold, the adjacent surfaces of the glass sheets being separated by a suitable parting material such as mica or various diatomaceous earths to prevent fusion of the sheets, and convey the bending mold into a lehr or kiln where heat is applied to the glass, thereby softening the latter. Upon softening, the individual glass sheets are bent from their original flat shape to curved cross-sectional shapes conforming as far as possible to that of the bending mold. The bent sheets so produced are ready for a laminating procedure which follows.

As the individual glass sheets, which are intended to comprise the finished laminate, are subjected to different degrees of heat within the kiln or the lehr due to their relative locations in the stack, the individual glass sheets sag at different rates during the bending operation. This differential sagging causes the adjacent surfaces of neighboring glass sheets to separate from each other.

Considerable dust and debris is present in the air within a kiln. Present production techniques require that sufficient parting material be applied between neighboring surfaces to avoid fusion of adjacent glass sheets during bending, but not so much that the parting material has to be removed prior to laminating. Hence, the glass sheets stacked for bending have their neighboring surfaces exposed to a considerable extent during the period of differential sagging.

Heretofore, considerable burning has occurred on the interior neighboring surfaces of the glass sheets stacked on the bending mold for simultaneous bending as a result of their exposure to hot dust particles within the kiln during the period of separation of these adjacent surfaces resulting from the differential sagging of the sheets. These burns cause optical difficulties which cannot be corrected in the finished laminate because of the inaccessibility of the interior surfaces of the individual glass sheets after the fabrication of the laminate is completed.

The cause of these burn marks is the impingement of the heated dust and dirt particles within the lehr or kiln upon the interior surfaces of the stack of glass sheets during the time the sheets are separated because of their different rates of sagging. While these deficiencies are susceptible of being remedied prior to completing the lamination by scratch wheeling techniques, such a solution is impractical because it interrupts the continuous operation of a factory wherein the matched bent glass sheets are conveyed from the cool end of a bending kiln into a laminating chamber and also because any scratch wheeling of an interior surface tends to spoil the match between the individual sheets that are intended to comprise a laminate.

I have discovered that by covering the stack of glass sheets with a suitable screen of geometric design during the bending cycle, especially during the critical period when the individual sheets are separated from each other, that burn marks on the interior surfaces of the laminates can be minimized considerably, thus resulting in more efficient production entailing a lower percentage of rejects than heretofore.

An object of the present invention is to provide improved apparatus for accomplishing the aforementioned object.

These and other objects of the present invention will become obvious upon studying the detailed description which follows.

In the drawing:

Figure 1 is a top plan view of a protective device comprising my present invention, with parts of the device broken away to show its relationship to a glass bending mold;

Figure 2 is a front elevational view of the structure disclosed in Figure 1, also with parts broken away;

Figure 3 is a cross-sectional view along the lines 3—3 of Figure 2;

Figure 4 discloses a cross-sectional view of a bending mold taken at right angles to the view of Figure 3, wherein an embodiment of my invention is specifically excluded to indicate the difficulties inherent in the prior art which my invention is designed to overcome.

My improved apparatus comprises a box-like metallic frame 10 provided with screening 12 at its upper surface 14 and four sides 16. The dimensions of the frame 10 are such that it fits over a male pan type bending mold 20 provided with an upper glass sheet supporting surface 22 convexly curved to the shape desired for a plurality of glass sheets 24 placed thereon. A pair of longitudinal extending members 26 is included at the bottom of the framework 28 of the mold 20 which supports the shaped surface 22. Longitudinal members 26 are sufficiently long to provide a support for the frame 10.

The screen 12 is preferably of a metallic material that does not deteriorate upon exposure to the heat required for bending the glass. Stainless steel wire cloth having a mesh between about 100 and 200 has been found suitable, because it provides a screen for keeping the hot dust particles away from the glass surfaces, yet provides virtually no barrier to the passage of heat from the heating elements present in the bending lehr to the glass surface, by virtue of its high heat conductive property. 165 mesh screening is preferred because of its capability of screening hot dust particles without producing a thermal barrier between the heaters and the glass surface. Screening having less than 100 mesh does not provide suitable protection against dust particles, whereas screening having more than 200 mesh is too fine and tends to sag under the heat imparted by the heating elements present in the bending lehr.

Figure 4 discloses how the individual sheets in a stack piled on a male mold behave during bending. Stack 24 which comprises sheets 24a, 24b, 24c, 24d, 24e and 24f is shown during an intermediate period in the bending cycle. Lowermost sheet 24a has sagged the most, sheet 24b has sagged to a lesser degree, etc., and the topmost sheet 24f has not sagged at all. It is noted that the spaces produced by the differential sagging result in an exposure of the glass surfaces in the region depicted by the arrows 30 at the right hand side of the figure. Similar exposed portions are produced at the left hand side of the drawing. Therefore, the utilization of the frame 10 provided with screening 12 as described above is necessary to protect the interior surfaces of a multiple paned assembly during the bending operation.

While a specific embodiment has been described herein, such description is included by way of illustration

What is claimed is:

In an apparatus for arcuately bending a plurality of superimposed stacked glass sheets in a lehr wherein dirt-laden hot gaseous convection currents are present and on a bending mold comprising a frame of at least four vertically extending side members and a convex shaping surface secured to the uppermost ends of said side members which permits the ends of said glass sheets to separate in spaced relation during bending and expose portions of the surfaces of each glass sheet to the dirt carried by said hot gaseous convection currents; the improvement which comprises an outwardly laterally extending arm secured to each of said frame vertical side members at the lowermost ends of said side members and having a horizontally disposed supporting surface spaced above the lowermost end of the adjacent side member, an open frame comprising spaced upper and lower rectangular frame members, said upper and lower frame members being secured to one another at corresponding corners by vertical members to provide an upper frame member and four side frame members surrounding the glass sheets on said convex bending surface and a screen secured to and extending across said upper frame member and each of said four side frame members, said lower rectangular frame member removably engaging the supporting surfaces of said laterally extending arms and said screens having a mesh in the range of 100 to 200, whereby dirt is excluded from the exposed portions of said glass sheets while permitting the flow of hot gaseous convection currents over said exposed portions.

References Cited in the file of this patent

UNITED STATES PATENTS

| | | |
|---|---|---|
| 418,713 | Griswold | Jan. 7, 1890 |
| 418,743 | McKee | Jan. 7, 1890 |
| 782,967 | Kinon | Feb. 21, 1905 |
| 1,514,122 | Archer | Nov. 4, 1924 |